US012753089B2

(12) United States Patent
Miyamoto

(10) Patent No.: US 12,753,089 B2
(45) Date of Patent: Oct. 6, 2026

(54) DISPERSED IRON OXIDE MAGNETIC POWDER SLURRY AND METHOD FOR PRODUCING SAME

(71) Applicant: DOWA ELECTRONICS MATERIALS CO., LTD., Tokyo (JP)

(72) Inventor: Yasuto Miyamoto, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 664 days.

(21) Appl. No.: 17/924,163

(22) PCT Filed: Aug. 24, 2021

(86) PCT No.: PCT/JP2021/031037

§ 371 (c)(1),
(2) Date: Nov. 9, 2022

(87) PCT Pub. No.: WO2022/054571

PCT Pub. Date: Mar. 17, 2022

(65) Prior Publication Data

US 2023/0192508 A1 Jun. 22, 2023

(30) Foreign Application Priority Data

Sep. 10, 2020 (JP) ................................ 2020-152155

(51) Int. Cl.
*C01G 51/40* (2025.01)
*G11B 5/714* (2006.01)
*H01F 1/11* (2006.01)

(52) U.S. Cl.
CPC .............. *C01G 51/40* (2013.01); *G11B 5/714* (2013.01); *H01F 1/11* (2013.01); *C01P 2002/50* (2013.01); *C01P 2004/04* (2013.01); *C01P 2004/64* (2013.01); *C01P 2006/42* (2013.01)

(58) Field of Classification Search
CPC ........ C01G 51/40; C01G 49/06; G11B 5/714; H01F 1/11; C01P 2002/50; C01P 2004/04; C01P 2004/64; C01P 2006/42; C01P 2002/52; C01P 2004/84
See application file for complete search history.

(56) References Cited

U.S. PATENT DOCUMENTS

2021/0300779 A1* 9/2021 Ohkoshi .................. H01F 1/11

FOREIGN PATENT DOCUMENTS

| | | |
|---|---|---|
| JP | 2008-063199 | 3/2008 |
| JP | 2008-063201 | 3/2008 |
| JP | 2008-174405 | 7/2008 |
| JP | 2016-174135 | 9/2016 |
| JP | 2019-001663 | 1/2019 |
| JP | 2019-175539 | 10/2019 |
| WO | 2008/029861 | 3/2008 |
| WO | 2008/149785 | 8/2010 |

* cited by examiner

*Primary Examiner* — Andrew J. Oyer
(74) *Attorney, Agent, or Firm* — Millen, White, Zelano & Branigan, P.C.; Christopher W. Brody

(57) ABSTRACT

A dispersed iron oxide magnetic powder slurry, in which the average secondary particle diameter of ε-type iron oxide measured with a dynamic light scattering particle size distribution analyzer is 65 nm or less, and which has good dispersibility, is obtained by adding a quaternary ammonium salt serving as a first dispersant and an alkali to a slurry containing ε-type iron oxide particles to bring the pH at 25° C. to 11 or higher, and thereafter adding an organic compound, which is an organic acid serving as a second dispersant and having two or more carboxy groups in the molecule, and in which one type or two types of a hydroxy group and an amino group are bound to carbon that does not constitute a carboxy group other than the carboxy groups to bring the pH at 25° C. of the slurry to 4 or higher and lower than 11.

7 Claims, No Drawings

DISPERSED IRON OXIDE MAGNETIC POWDER SLURRY AND METHOD FOR PRODUCING SAME

TECHNICAL FIELD

The present invention relates to an iron oxide magnetic powder suitable for a high-density magnetic recording medium, a radio wave absorber, etc., and particularly to a dispersed iron oxide magnetic powder slurry in which the average particle diameter of the particles is on the order of nanometers, and a method for producing the same.

BACKGROUND ART

While ε-$Fe_2O_3$ is an extremely rare phase among iron oxides, particles thereof having a size on the order of nanometers show a great coercive force (Hc) of about 20 kOe ($1.59\times10^6$ A/m) at room temperature, and therefore, a production method for synthesizing ε-$Fe_2O_3$ as a single phase has been conventionally studied (PTL 1). Further, when ε-$Fe_2O_3$ is used in a magnetic recording medium, there is currently no material for a magnetic head having a high level of saturation magnetic flux density corresponding thereto, and therefore, the adjustment of the coercive force is also performed by partially substituting the Fe sites of ε-$Fe_2O_3$ by a trivalent metal such as Al, Ga, or In, and the relationship between the coercive force and the radio wave absorption properties has also been studied (PTL 2).

On the other hand, in the field of magnetic recording, development of a magnetic recording medium having a high ratio of reproduced signal level to particulate noise (C/N ratio: carrier to noise ratio) has been conducted, and in order to increase the recording density, there has been a demand for refinement of magnetic particles constituting a magnetic recording layer. However, the refinement of magnetic particles is generally likely to cause deterioration of the environmental stability and thermal stability thereof, and there is a concern about the deterioration of the magnetic properties of the magnetic particles under use or storage environment. Therefore, by partially substituting the Fe sites of ε-$Fe_2O_3$ by another metal having excellent heat resistance, various types of partially substituted ε-$Fe_2O_3$, in which the particle size is reduced and the coercive force is made variable, and which also have excellent environmental stability and thermal stability, represented by a general formula ε-$A_xB_yFe_{2-x-y}O_3$ or ε-$A_xB_yC_zFe_{2-x-y-z}O_3$ (wherein A is a divalent metal element such as Co, Ni, Mn, or Zn, B is a tetravalent metal element such as Ti, and C is a trivalent metal element such as In, Ga, or Al) have been developed (PTL 3).

ε-$Fe_2O_3$ is obtained as a stable phase with a size on the order of nanometers, and therefore, a special method is needed for its production. In the above-mentioned PTLs 1 to 3, a method for producing ε-$Fe_2O_3$, in which a fine crystal of an iron oxyhydroxide produced by a liquid-phase method is used as a precursor, and the precursor is coated with silicon oxide by a sol-gel method, followed by a heat treatment, is disclosed, and as the liquid-phase method, each of a reverse micelle method using an organic solvent as a reaction medium and a method using only an aqueous solution as a reaction medium is disclosed. However, in ε-$Fe_2O_3$ or partially substituted ε-$Fe_2O_3$ obtained by such a method, there are variations in magnetic properties, and therefore, improvement of the magnetic properties thereof by removing the silicon oxide coating after the heat treatment, and performing a classification treatment has been proposed.

For example, in PTL 4 and PTL 5, a technique for centrifuging ε-$Fe_2O_3$ or partially substituted ε-$Fe_2O_3$ produced by a reverse micelle method in ultrapure water is disclosed. The reason why ultrapure water is used here as the dispersion medium is to reduce the ionic strength of the medium and enhance the dispersibility of the slurry. However, since ε-$Fe_2O_3$ or partially substituted ε-$Fe_2O_3$ originally does not show good dispersibility at around neutral pH, in the case of the classification method disclosed in PTL 4 and PTL 5, in order to obtain good dispersibility in a neutral region, it is necessary to allow the silicon oxide coating to partially remain on ε-$Fe_2O_3$ or partially substituted ε-$Fe_2O_3$, and there was a problem that it is necessary to remove the silicon oxide coating again after the classification treatment.

As an improved method of the above-mentioned dispersion treatment method, PTL 6 discloses a technique for performing a classification treatment after adding NaOH to a slurry containing particles of ε-$Fe_2O_3$ or partially substituted ε-$Fe_2O_3$ produced using an aqueous solvent to adjust the pH of the dispersion liquid to 10 or higher and 11 or lower. Further, as the improved method of the technique disclosed in PTL 6, PTL 7 discloses a technique for obtaining an iron oxide magnetic powder with a low coefficient of variation of the particle diameter by classifying the slurry with a pH adjusted to 11 or higher and 14 or lower using a tetraalkylammonium salt as a dispersant.

Note that in the present description, ε-iron oxide or partially substituted ε-iron oxide resulting from partial substitution of Fe sites by another metal element is sometimes collectively referred to as ε-type iron oxide.

CITATION LIST

Patent Literature

PTL 1: JP-A-2008-174405
PTL 2: WO 2008/029861
PTL 3: WO 2008/149785
PTL 4: JP-A-2008-063199
PTL 5: JP-A-2008-063201
PTL 6: JP-A-2016-174135
PTL 7: JP-A-2019-175539

SUMMARY OF INVENTION

Technical Problem

As described above, the application of the s-type iron oxide magnetic powder to use in a magnetic recording medium has been studied. A slurry in which an iron oxide magnetic powder after a dispersion treatment obtained by the production method disclosed in PTL 7 is dispersed is configured such that the average secondary particle diameter of the particles of ε-type iron oxide measured with a dynamic light scattering particle size distribution analyzer is 65 nm or less and has excellent dispersibility, and is suitable for use in a coating material containing an iron oxide magnetic powder necessary for forming a magnetic layer constituting a magnetic recording medium. However, on the other hand, the pH of the obtained dispersed iron oxide magnetic powder slurry after the dispersion treatment is as high as 11 or higher. In the case where the pH is high in this manner, when the dispersed iron oxide magnetic powder slurry after the dispersion treatment is mixed with a resin for producing a coating material containing the above-mentioned iron oxide magnetic powder, the resin may be degraded due to such a high pH depending on the type of resin, and there was a problem that the usable resin is limited. For example, as the resin which may be degraded at a pH as high as 11 or higher, a urethane resin, a phenolic resin, and the like are known. Therefore, in order to increase the variety of the resin that can be mixed and used, there has been a demand for a magnetic particle slurry containing ε-type iron oxide with a lower pH.

When the inventor added sulfuric acid to the dispersed iron oxide magnetic powder slurry with a pH of 11 or higher after the dispersion treatment to adjust the pH to around a neutral pH in response to this problem, it was found that the average secondary particle diameter measured with a dynamic light scattering particle size distribution analyzer is significantly increased, and a dispersed iron oxide magnetic powder slurry having both a small average secondary particle diameter and a low pH lower than 11 has not yet been obtained.

In view of the above points, an object of the present invention is to provide a dispersed s-type iron oxide magnetic powder slurry having excellent dispersibility and also having a pH lower than 11, and a method for producing the same.

Solution to Problem

The present inventor found that when a polycarboxylic acid, which is an organic acid having two or more carboxy groups in the molecule, and has one type or two types of a hydroxy group and an amino group other than the carboxy groups is added as a second dispersant to a slurry containing an s-type iron oxide magnetic powder and also containing a quaternary ammonium salt, preferably a tetraalkylammonium salt as a dispersant, even if the pH of the slurry is decreased, the dispersibility does not deteriorate, and thus completed the present invention described below.

In order to solve the above problem, in the present invention, (1) a dispersed iron oxide magnetic powder slurry, which is a dispersed iron oxide powder slurry, in which particles of ε-iron oxide or ε-iron oxide resulting from partial substitution of Fe sites by another metal element (s-type iron oxide) are dispersed in an aqueous solution, wherein an average secondary particle diameter of the particles of ε-iron oxide or ε-iron oxide resulting from partial substitution of Fe sites by another metal element measured with a dynamic light scattering particle size distribution analyzer (DLS average particle diameter) is 65 nm or less, and the pH at 25° C. is 4 or higher and lower than 11 is provided.

(2) It is preferred that the ratio of the DLS average particle diameter and the TEM average particle diameter measured with a transmission electron microscope of the particles of ε-type iron oxide (DLS average particle diameter/TEM average particle diameter) is 4 or less.

(3) Further, it is preferred that the TEM average particle diameter of the s-type iron oxide particles is 8 nm or more and 30 nm or less.

(4) Further, it is preferred that the dispersed iron oxide powder slurry in the above item (1) contains a quaternary ammonium salt and a polycarboxylic acid, which is an organic acid having two or more carboxy groups in the molecule, and has one type or two types of a hydroxy group and an amino group other than the carboxy groups.

(5) Further, it is preferred that the quaternary ammonium salt is a tetraalkylammonium salt.

(6) Further, in the present invention, a method for producing a dispersed iron oxide magnetic powder slurry, including a step of adding a quaternary ammonium salt serving as a first dispersant and an alkali to a slurry containing ε-type iron oxide particles, thereby obtaining a slurry with a pH at 25° C. of 11 or higher, and a step of adding a polycarboxylic acid, which is an organic acid serving as a second dispersant and having two or more carboxy groups in the molecule, and has one type or two types of a hydroxy group and an amino group amino groups other than the carboxy groups to the slurry with a pH of 11 or higher, thereby bringing the pH at 25° C. of the slurry to a value lower than 11 is provided.

(7) It is preferred that the DLS average particle diameter of the ε-type iron oxide particles in the dispersed iron oxide magnetic powder slurry with a pH at 25° C. brought to a value lower than 11 is 65 nm or less.

(8) Further, it is preferred that the quaternary ammonium salt is a tetraalkylammonium hydroxide.

Advantageous Effects of Invention

By using the production method of the present invention, a dispersed iron oxide magnetic powder slurry having good dispersibility in a pH region lower than before can be obtained.

DESCRIPTION OF EMBODIMENTS

[Iron Oxide Magnetic Powder]

Examples of the s-type iron oxide that can be used as a starting material in the production method of the present invention include the following.

One represented by a general formula: ε-$Fe_2O_3$ and containing no substituent element One represented by a general formula: ε-$C_zFe_{2-z}O_3$ (wherein C is a trivalent metal element)

One represented by a general formula: ε-$A_xB_yFe_{2-x-y}O_3$ (wherein A is a divalent metal element and B is a tetravalent metal element)

One represented by a general formula: ε-$A_xC_zFe_{2-x-z}O_3$ (wherein A is a divalent metal element and C is a trivalent metal element)

One represented by a general formula: ε-$B_yC_zFe_{2-y-z}O_3$ (wherein B is a tetravalent metal element and C is a trivalent metal element)

One represented by a general formula: ε-$A_xB_yC_zFe_{2-x-y-z}O_3$ (wherein A is a divalent metal element, B is a tetravalent metal element, and C is a trivalent metal element)

Here, the type substituted by only an element C has an advantage that the coercive force of the magnetic particles can be arbitrarily controlled and the same space group as that of ε-$Fe_2O_3$ can be easily obtained, but the thermal stability is slightly poor. Therefore, it is preferred to substitute it by an element A or B at the same time.

The type substituted by two elements A and B has excellent thermal stability and can maintain the coercive force of the magnetic particles at normal temperature high, but it is somewhat difficult to obtain a single phase of the same space group as that of ε-$Fe_2O_3$.

The three-element substitution type substituted by A, B, and C has the best balance of the above-mentioned properties, and is excellent in heat resistance, ease of acquisition of a single phase, and controllability of the coercive force, and is most preferred. Examples of the substituent element include Co, Ni, Mn, Zn, and the like as A, Ti, Sn, and the like as B, and In, Ga, Al, and the like as C. In the case of the three-element substitution type, it is preferred that the metal elements that partially substitute the Fe sites are preferably Ga, Co, and Ti from the viewpoint of balance of practical properties.

The preferred ranges of the substitution amounts x, y, and z of a three-element substituted material are as follows.

x and y can take an arbitrary range of $0<x<1$ and $0<y<1$. However, in consideration of magnetic recording application, it is necessary to change the coercive force of the magnetic particles of the three-element substituted material to some extent from that of $\varepsilon$-$Fe_2O_3$, and therefore, it is preferred to set x and y within the following ranges: $0.01\leq x\leq 0.2$ and $0.01\leq y\leq 0.2$. Similarly to x and y, z may also be within the following range: $0<z<1$, but from the viewpoint of ease of control of the coercive force and acquisition of a single phase, it is preferred to set z within the following range: $0<z\leq 0.5$.

In the production method of the present invention, the $\varepsilon$-type iron oxide used as the starting material can maintain a high coercive force at normal temperature by appropriately adjusting the value of y, or the values of x and y, and further, it is also possible to control the coercive force to a desired value by adjusting x, y, and z.

In the iron oxide magnetic powder of the present invention, $\alpha$-type iron oxide, $\gamma$-type iron oxide, or an $Fe_3O_4$ crystal sometimes exists as an impurity other than an $\varepsilon$-type iron oxide crystal, but these are collectively referred to as iron oxide magnetic powder.

[Average Particle Diameter]

In the production method of the present invention, it is preferred that magnetic particles of the $\varepsilon$-type iron oxide used as the starting material are fine to such an extent that each particle becomes a magnetic single domain structure. The average particle diameter thereof measured with a transmission electron microscope (TEM average particle diameter) is preferably 30 nm or less. However, when the average particle diameter is too small, the abundance ratio of fine particles that do not contribute to the improvement of the magnetic properties described above increases to deteriorate the magnetic properties per unit weight of the magnetic particle powder, and therefore, the TEM average particle diameter is preferably 8 nm or more. In the present invention, the $\varepsilon$-type iron oxide to serve as the starting material may be prepared using any method including the production methods described in PTLs 1 to 6.

When the production method of the present invention is used, as will be described later, a dispersed iron oxide powder slurry having a pH at 25° C. lower than 11 and a DLS average particle diameter of 65 nm or less is obtained, but it is preferred that the ratio of the DLS average particle diameter and the TEM average particle diameter (DLS average particle diameter/TEM average particle diameter) is 4 or less. Note that the lower limit of the DLS average particle diameter/TEM average particle diameter is 1.

Since the magnetic properties of the magnetic particles depend on the primary particle diameter of the magnetic particles, the above-mentioned classification treatment is performed for making the primary particle diameter of the magnetic particles uniform. When the DLS average particle diameter/TEM average particle diameter exceeds 4, the number of aggregated particles increases. Therefore, it is difficult to separate particles with a large primary particle diameter and secondary particles with a diameter increased due to aggregation although the primary particle diameter is small by the classification treatment. Therefore, the DLS average particle diameter/TEM average particle diameter is preferably 4 or less.

[Iron Oxide Powder-Containing Slurry]

In the production method of the present invention, first, a slurry in which the magnetic particles of the $\varepsilon$-type iron oxide to serve as the starting material are dispersed in pure water is prepared. In this case, it is preferred to adjust the electrical conductivity of the solvent constituting the slurry to 15 mS/m or less from the viewpoint of suppression of aggregation of the iron oxide and reduction of impurities. When the production is performed by a wet method, and a slurry containing $\varepsilon$-type iron oxide magnetic particles immediately after removing a silicon oxide coating in an alkali solution is used as the starting material, it is preferred to perform washing with pure water until the electrical conductivity of the solvent becomes 15 mS/m or less. Thereafter, a quaternary ammonium salt is added to the slurry to adjust the pH at 25° C. of the slurry to 11 or higher and 14 or lower. Note that, as will be described later, when a hydroxide of a tetraalkylammonium salt is used as the quaternary ammonium salt, the pH at 25° C. of the slurry falls within the above-mentioned range even without adding another alkali.

Note that the value of pH described in the present description is a value measured using a glass electrode according to JIS Z 8802, and is a value measured with a pH meter calibrated using a suitable buffer solution corresponding to the pH range to be measured as a pH standard solution. Further, the pH described in the present description is a value obtained by directly reading a measured value indicated by a pH meter compensated with a temperature compensation electrode under the condition of 25° C.

[Quaternary Ammonium Ion]

The quaternary ammonium ion is a cation resulting from substitution of all four hydrogen atoms of an ammonium ion ($NH_4^+$) by an organic group, and as the substituent, an alkyl group or an aryl group is generally used. In the production method of the present invention, as a first dispersant for the magnetic particles of the $\varepsilon$-type iron oxide, a quaternary ammonium ion that is stable in a strong alkaline region in which the dispersibility of the magnetic particles is good is used. Among the quaternary ammonium ions, it is preferred to use a tetraalkylammonium ion that is industrially easily available. The tetraalkylammonium ion is a quaternary ammonium cation and is a polyatomic ion whose molecular formula is represented by $NR_4^+$ (R is an arbitrary alkyl group). The tetraalkylammonium salt is a completely dissociated salt and is present as a stable ion in an alkaline aqueous solution, and therefore is used as a surface modifier for improving the dispersibility of the $\varepsilon$-type iron oxide in the slurry in the production method of the present invention. Examples of a supply source of the tetraalkylammonium ion include a hydroxide, a chloride, a bromide, and the like, but a hydroxide of the tetraalkylammonium ion is a strong alkali by itself, and therefore, when it is added to the slurry, the pH at 25° C. of the slurry falls within the above-mentioned preferred pH range even without adding another alkali, and thus, it is more preferred to use a tetraalkylammonium hydroxide as the dispersant.

Examples of the tetraalkylammonium salt include quaternary ammonium salts having the same alkyl group such as a tetramethylammonium salt, a tetraethylammonium salt, a tetrapropylammonium salt, and a tetrabutylammonium salt, and quaternary ammonium salts having different alkyl groups, and any of them can be used, but it is preferred to use a hydroxide such as tetramethylammonium hydroxide (TMAOH), tetraethylammonium hydroxide (TEAOH), tetrapropylammonium hydroxide, and tetrabutylammonium hydroxide, respectively.

Although not particularly limited in the present invention, the concentration of the tetraalkylammonium ion is preferably set to 0.009 mol/kg or more and 1.0 mol/kg or less in order to modify the surfaces of the ε-type iron oxide particles in the slurry and enhance the dispersibility thereof. The quantitative determination of the concentration of the quaternary ammonium ion in the dispersed iron oxide magnetic powder slurry can be performed by ion chromatography.

[Second Dispersant]

The most important technical feature of the present invention is that to the slurry containing the iron oxide powder with a pH at 25° C. adjusted to 11 or higher and 14 or lower by adding the above-mentioned tetraalkylammonium salt, a polycarboxylic acid, which is an organic acid having two or more carboxy groups in the molecule, and has one type or two types of a hydroxy group and an amino group other than the carboxy groups is added as a second dispersant, and also the pH at 25° C. of the slurry is adjusted to 4 or higher and lower than 11. When the organic compound, that is, the second dispersant is added, even if the pH at 25° C. of the slurry to which the tetraalkylammonium salt is added is decreased to a value lower than 11, the dispersibility of the slurry is never deteriorated. Specific examples of the organic compound include citric acid, tartaric acid, malic acid, glutamic acid, aspartic acid, isocitric acid, hydroxycitric acid, hydroxyphthalic acid, hydroxyterephthalic acid, and 2-hydroxy-1,3,5-benzenetricarboxylic acid.

It is currently unknown why the dispersibility of the slurry is not deteriorated when the organic compound is added thereto even if the pH at 25° C. of the slurry to which the tetraalkylammonium salt is added is decreased to a value lower than 11, but the present inventor presumes the mechanism as follows.

That is, it is thought that one of the ionized carboxy groups is bound to the surface of the magnetic iron oxide particle, and the other ionized carboxy group faces the outside of the particle to generate charge repulsion, thereby improving the dispersibility. Although the effects of the hydroxy group and the amino group are not clear, it is thought that they play a role in assisting the carboxy group to bind to the surface of the particle or assisting the carboxy group to face the outside of the particle.

The reason why the pH at 25° C. of the slurry after adding the organic compound is set to a value lower than 11 is that in order to produce a coating material for forming a magnetic layer of a magnetic recording medium, even if a resin that is easily degraded at a strongly alkaline pH is used when the dispersed iron oxide magnetic powder slurry and the resin are mixed, the resin is prevented from degrading, and the variety of the resin that can be used when a coating material is produced is increased. In addition, by setting the pH at 25° C. of the slurry after adding the organic compound to a value lower than 11, it becomes unnecessary to adopt an expensive equipment specification in consideration of damage due to an alkali for the equipment to be used in a classification operation or a solid-liquid separation treatment, and there is also an advantage in terms of production cost. From the viewpoint of suppressing the increase in cost of the equipment to be used in the classification operation or the solid-liquid separation treatment, the pH at 25° C. of the slurry after adding the organic compound is more preferably set to 10 or lower. Further, when the pH at 25° C. of the slurry becomes lower than 4, not only the s-type iron oxide particles are dissolved, but also damage to the equipment to be used in the classification operation or the solid-liquid separation treatment increases again, and therefore, such a pH is not preferred.

Although not particularly limited in the present invention, the concentration of the second dispersant is preferably set to 0.009 mol/kg or more and 1.0 mol/kg or less in order to increase the dispersibility of the ε-type iron oxide powder in the obtained slurry. The quantitative determination of the concentration of the second dispersant in the dispersed iron oxide magnetic powder slurry can be performed by ion chromatography.

Note that the organic compound itself is a carboxylic acid having a plurality of carboxy groups in the molecule, and therefore, when the organic compound is added to the slurry to which the tetraalkylammonium salt is added, the pH of the slurry is decreased, however, the pH adjustment may be performed by adding another alkali or acid as needed.

[Dispersion Treatment]

In the production method of the present invention, the iron oxide powder-containing slurry with a pH adjusted by adding the first and second dispersants may be subjected to a dispersion treatment. Here, the dispersion treatment is a treatment of loosening the aggregation of aggregates of the ε-type iron oxide contained in the iron oxide powder-containing slurry. As the dispersion treatment method, a known method such as dispersion with an ultrasonic disperser, pulverization using a medium such as a bead mill, or stirring with a stirring blade, a shaking machine, or a shaker can be adopted.

When the average secondary particle diameter of the iron oxide measured with a dynamic light scattering particle size distribution analyzer (DLS average particle diameter) of the slurry exceeds 65 nm before the dispersion treatment, the dispersion treatment of the iron oxide powder-containing slurry is performed until the DLS average particle diameter becomes 65 nm or less.

[Classification Operation and Solid-Liquid Separation Operation]

The production method of the present invention is a method for obtaining an iron oxide powder-containing slurry in which the dispersibility is good and the pH of the system is lower than before, but in order to obtain an iron oxide powder as a magnetic material, the iron oxide powder-containing slurry obtained by the present invention is further subjected to a classification operation and a solid-liquid separation operation.

As the classification operation, a known wet classification method such as a centrifugation method can be adopted. When the supernatant is removed after the slurry is subjected to a centrifuge, fine particles can be removed, and when the precipitate is removed after the slurry is subjected to a centrifuge, coarse particles can be removed. The gravitational acceleration during centrifugation is preferably 40,000 G or more. Further, it is preferred to repeat the classification operation three or more times.

After the classification operation, the iron oxide magnetic powder is collected using a known solid-liquid separation method, and according to need, the powder is washed with water, and then dried.

[Transmission Electron Microscope (TEM) Observation]

TEM observation of the particles of the s-type iron oxide contained in the dispersed iron oxide magnetic powder slurry obtained by the production method of the present invention was performed under the following conditions. In the TEM observation, JEM-1011 manufactured by JEOL Ltd. was used. For particle observation, a TEM photograph taken at a magnification of 100,000 times was used (those after removing the silicon oxide coating were used).

—Measurement of Average Particle Diameter and Particle Size Distribution—

Digitization was used in the evaluation of the TEM average particle diameter and the particle size distribution. Mac-View Ver. 4.0 was used as the image processing software. When the image processing software is used, the particle diameter of a certain particle is calculated as the length of the long side of a rectangle having the smallest area among the rectangles circumscribing the particle. As for the number of particles, 200 or more particles were measured.

The selection criteria for the particles to be measured among the particles shown in the transmission electron micrograph were as follows.

[1] A particle that is partially outside the visual field of the micrograph is not measured.

[2] A particle with a well-defined contour and existing independently is measured.

[3] Even if the particle shape deviates from the average particle shape, a particle that is independent and can be measured as a single particle is measured.

[4] Particles that overlap each other, but the boundaries between the particles are clear, and also the shape of the entire particle can be determined are each measured as a single particle.

[5] Overlapping particles whose boundaries are not clear and also whose overall shape is unknown are regarded as particles whose shape cannot be determined and are not measured.

The number average particle diameter of the particles selected based on the above criteria was calculated and defined as the average particle diameter by TEM observation of the particles of the ε-type iron oxide contained in the dispersed iron oxide magnetic powder slurry. Further, the number ratio (%) of particles with a particle diameter of 8 nm or less among the selected particles was calculated.

[DLS Average Particle Diameter]

The dispersed iron oxide magnetic powder slurry of the present invention is characterized in that the DLS average diameter is 65 nm or less. The fact that the DLS average diameter is 65 nm or less means that the iron oxide magnetic powder has excellent dispersibility necessary for forming a magnetic layer constituting a magnetic recording medium, and the dispersed iron oxide magnetic powder slurry of the present invention can be favorably used for application to a coating material containing an iron oxide magnetic powder for forming a magnetic layer of a magnetic recording medium. The lower limit of the DLS average diameter is not particularly specified, but it is considered that the DLS average diameter in a state where the particles of the iron oxide magnetic powder contained in the slurry are completely separated into individual particles is the theoretical minimum value. That is, it can be considered that the lower limit of the DLS average diameter is the TEM average particle diameter of the iron oxide magnetic powder constituting the slurry.

[Measurement of DLS Average Particle Diameter]

The DLS average particle diameter by a dynamic light scattering particle size distribution analysis of the slurry containing the particles of the ε-type iron oxide obtained by the production method of the present invention was measured under the following conditions.

As the dynamic light scattering particle size distribution analyzer (FPAR-1000K high sensitivity specification) manufactured by Otsuka Electronics Co., Ltd. was used, and as a fiber probe, a dilution-type probe was used. The measurement was performed under the following measurement conditions: a measurement time (sec): 180 seconds, the number of repetitions: 1, and solvent setting: water. As the analysis mode, the Cumulant method was used.

[Compositional Analysis by High-Frequency Inductively Coupled Plasma Atomic Emission Spectroscopy (ICP-AES)]

The compositional analysis of the obtained ε-type iron oxide magnetic powder was performed. In the compositional analysis, ICP-720ES manufactured by Agilent Technologies, Inc. was used, and the analysis was performed by setting the measurement wavelength (nm) as follows: Fe: 259.940 nm, Ga: 294.363 nm, Co: 230.786 nm, and Ti: 336.122 nm.

EXAMPLES

Example 1

<Preparation of Slurry Containing Particles of ε-Type Iron Oxide>

2689 g of a raw material solution with an Fe(III) concentration of 1.300 mol/kg, a Ga(III) concentration of 0.133 mol/kg, a Co(II) concentration of 0.053 mol/kg, a Ti(IV) concentration of 0.038 mol/kg, a chloride ion concentration of 3.996 mol/kg, and a nitrate ion concentration of 0.556 mol/kg was prepared. The molar ratio of metal ions in the raw material solution is as follows: Fe:Ga:Co:Ti=1.705:0.175:0.070:0.050. Subsequently, in a 10 L reaction vessel, 4500 g of pure water was placed, and the liquid temperature was adjusted to 40° C. while mechanically stirring with a stirring blade. Subsequently, while continuing stirring and keeping the liquid temperature at 40° C., the raw material solution and an ammonia aqueous solution at 3.414 mol/kg were simultaneously added into the pure water, and thereafter, stirring was performed for 60 minutes while keeping the liquid temperature at 40° C., whereby a colloidal solution was obtained (procedure 1). In that case, the raw material solution was continuously added over 240 minutes at an addition rate of 11.2 g/min, and the ammonia aqueous solution was continuously added over 240 minutes at an addition rate of 11.2 g/min.

Subsequently, to the colloidal solution obtained by the procedure 1, 866 g of a citric acid solution with a citric acid concentration of 0.694 mol/kg was continuously added over 60 minutes under the condition of 40° C., and thereafter, 560 g of an ammonia aqueous solution at 12.994 mol/kg was added thereto all at once, and then, the resulting mixture was held for 10 minutes while stirring under the condition of temperature of 40° C., whereby a slurry of precursor particles, which is an intermediate product of iron oxide, was obtained (procedure 2).

The precursor slurry obtained by the procedure 2 was collected and washed using an ultrafiltration membrane having a UF molecular weight cut-off of 50,000 until the electrical conductivity of the filtrate became 30 mS/m or less, whereby a washed slurry was obtained (procedure 3). The washing was performed by a cross-flow method. The filtrate that passed through the filtration membrane was discharged, and filtration was performed while replenishing pure water to the slurry that did not pass through the filtration membrane, and the replenishing amount of pure water during washing was adjusted so that the total metal concentration of Fe, Ga, Co, and Ti in the obtained washed slurry became 0.685 mol/kg (procedure 3).

Thereafter, 1650 g of the washed slurry obtained by the procedure 3 was taken out, and while stirring the taken out slurry, 2050 g of ethanol was added thereto and the temperature was adjusted to 40° C., and 971 g of an ammonia aqueous solution at 12.994 mol/kg and also 3870 g of tetraethoxysilane (TEOS) as a silicon compound having a hydrolyzable group were added thereto over 35 minutes. Thereafter, while keeping the liquid temperature at 40° C., stirring was continued as such for 1 hour so as to coat the precursor with a hydrolysate of the silicon compound. Thereafter, the obtained slurry was subjected to washing and solid-liquid separation, and the solid was collected as a cake (procedure 4).

After the cake (the precursor coated with the gel-like hydrolysate of the silicon compound) obtained by the procedure 4 was dried, the resulting dry powder was subjected to a heat treatment at 1070° C. for 4 hours in a furnace with an air atmosphere, whereby a powder of ε-iron oxide resulting from partial substitution of Fe sites by another metal element coated with silicon oxide was obtained. Note that the hydrolysate of the silicon compound is converted into an oxide when the heat treatment is performed in the air atmosphere (procedure 5).

The powder of ε-iron oxide resulting from partial substitution of Fe sites by another metal element coated with silicon oxide obtained by the procedure 5 was stirred for 20 hours in a 20 mass % NaOH aqueous solution at about 80° C. so as to carry out a treatment of removing the silicon oxide on the surfaces of the particles, whereby a slurry containing particles of s-type iron oxide was obtained (procedure 6).

The slurry obtained by the procedure 6 was washed with pure water until the electrical conductivity became 1 mS/m or less, whereby a washed slurry according to Example 1 was obtained (procedure 7). The washed slurry obtained by the procedure 7 had a DLS average particle diameter of 135 nm and had a pH at 25° C. of 8.7. The washed slurry obtained by the procedure 7 was dispersed in pure water for 10 minutes under the condition of a frequency of 35 kHz using an ultrasonic disperser (UT-105 manufactured by Sharp Corporation) to prepare a slurry, and the prepared slurry was dropped on a collodion membrane on a grid and adhered thereto, followed by natural drying, and then carbon vapor deposition, and the resultant was subjected to TEM observation. As a result of measuring 200 particles by TEM observation, the TEM average particle diameter of the ε-type iron oxide particles was 15.0 nm, and the number ratio of particles with a particle diameter of 8 nm or less was 3.0%. Further, the obtained slurry was dried at 110° C., and a compositional analysis was performed for the obtained powder, and the molar compositional ratio of each metal element was calculated when the total amount of iron and the substituent metal elements was set to 2 mol. As a result, the molar ratio of metal ions in the obtained powder was as follows: Fe:Ga:Co:Ti=1.75:0.15:0.05:0.05.

Note that in Examples and Comparative Examples described in the present description, the slurry containing the particles of the ε-type iron oxide obtained by the above procedures up to the procedure 7 was used as the starting material.

<Production of Dispersed Iron Oxide Magnetic Powder Slurry>

To the washed slurry according to Example 1, a 35 mass % tetraethylammonium hydroxide (TEAOH) aqueous solution was added as the first dispersant, and the resulting mixture was stirred, and then dispersed for 1 hour under the condition of a frequency of 40 kHz using an ultrasonic disperser (Yamato 5510 manufactured by Yamato Scientific Co., Ltd.) to prepare a dispersed alkaline iron oxide magnetic powder slurry (procedure 8). Note that TEAOH is a quaternary ammonium salt. The addition amount of the TEAOH aqueous solution was set so that the concentration of TEAOH in the slurry obtained by the procedure 8 became 0.099 mol/kg. The slurry obtained by the procedure 8 had a pH at 25° C. of 13.0, and had a DLS average particle diameter of 30 nm.

To the slurry obtained by the procedure 8, a 20 mass % citric acid aqueous solution was added as the second dispersant so that the pH at 25° C. became 7.0, and the resulting mixture was stirred, and then dispersed using an ultrasonic disperser, whereby a dispersed iron oxide magnetic powder slurry according to Example 1 was obtained (procedure 9). Note that citric acid has three carboxy groups in the molecular structure, and also has a hydroxy group other than the carboxy groups. When the DLS average particle diameter of the dispersed iron oxide magnetic powder slurry obtained by the procedure 9 was measured, it was 26 nm. In addition, when the TEM average particle diameter of the particles of the ε-type iron oxide contained in the dispersed iron oxide magnetic powder slurry obtained by the procedure 9 was measured by the same procedure as that for the slurry obtained by the procedure 7, the result was 16.1 nm. From the above, the ratio of the DLS average particle diameter to the TEM average particle diameter: DLS average particle diameter/TEM average particle diameter of the slurry obtained by the procedure 9 was calculated to be 1.6.

From the above results, it is found that a dispersed iron oxide magnetic powder slurry having a DLS average particle diameter as small as 26 nm and also having a pH at 25° C. as low as 7.0 is obtained by adding a quaternary ammonium salt as the first dispersant to a slurry containing particles of s-iron oxide or s-iron oxide resulting from partial substitution of Fe sites by another metal element and also adjusting the pH at 25° C. to 11 or higher, and thereafter, adding a compound, which has two or more carboxy groups, and in which one type or two types of a hydroxy group and an amino group are bound to carbon that does not constitute a carboxy group as the second dispersant and also adjusting the pH at 25° C. to 7.0. The dispersed iron oxide magnetic powder slurry having a small DLS average particle diameter and also having a low pH in this manner can prevent a resin from degrading even if a resin such as a urethane resin or a phenolic resin that is easily degraded at a strongly alkaline pH is used when the dispersed iron oxide magnetic powder slurry and the resin are mixed in order to produce a coating material for forming a magnetic layer of a magnetic recording medium, and the variety of the resin that can be used when the coating material is produced can be increased, and therefore, the slurry is suitable for use in a magnetic recording medium.

<Classification of Particles of ε-Type Iron Oxide Contained in Dispersed Iron Oxide Magnetic Powder Slurry>

40 g of the dispersed iron oxide magnetic powder slurry according to Example 1 obtained by the procedure 9 was subjected to a centrifugation treatment at a rotational speed of 18,000 rpm for 30 minutes with an R20A2 rotor of a centrifuge (Himac CR21GII manufactured by Hitachi Koki Co., Ltd.), and 30 g of the supernatant slurry was recovered. The centrifugal acceleration in the centrifugation treatment was set to 39,000 G. The operation of addition of 30 g of a 1.5 mass % TEAOH aqueous solution, ultrasonic dispersion, a centrifugation treatment at 18,000 rpm and 39,000 G for 30 minutes, and removal of 30 g of the supernatant slurry was further repeated 9 times with respect to the slurry on the precipitation side (procedure 10). The number ratio of particles of 8 nm or less by TEM observation in the particles of the ε-type iron oxide contained in the slurry on the precipitation side obtained by the procedure 10 was 1.5%, and it was confirmed that the number ratio of particles having a particle diameter of 8 nm or less was decreased as compared with the slurry obtained by the procedure 7. From this, it is found that by the addition of the first and second dispersants, a dispersed iron oxide magnetic powder slurry having a DLS average particle diameter as small as 65 nm or less in a low pH region that the pH at 25° C. is lower than 11 is obtained, and as a result, a classification operation using a centrifuge can be carried out in a low pH region that the pH at 25° C. is lower than 11, and the number ratio of particles of 8 nm or less can be decreased.

The preparation conditions of the slurry according to Example 1 and the physical properties of the obtained slurry are summarized in Table 1. Further, in Table 1, the concentrations of the first dispersant and the second dispersant in the obtained dispersed iron oxide magnetic powder slurry are also shown. Here, the concentration of the first dispersant (mol/kg) of this Example indicates the number of moles of TEACH contained in 1 kg of the dispersed iron oxide magnetic powder slurry, and the concentration of the second dispersant (mol/kg) of this Example indicates the number of moles of citric acid contained in 1 kg of the dispersed iron oxide magnetic powder slurry. Note that in Table 1, such values for the other Examples and Comparative Examples are also shown.

Example 2

A dispersed iron oxide magnetic powder slurry according to Example 2 was obtained by the same procedures as in Example 1 except that a 20 mass % tartaric acid aqueous solution was added in place of the citric acid aqueous solution as the second dispersant. Note that tartaric acid has two carboxy groups in the molecular structure, and a hydroxy group is bound to carbon that does not constitute a carboxy group. The DLS average particle diameter of the obtained slurry was 36 nm. The TEM average particle diameter of the particles of the ε-type iron oxide contained in the obtained slurry was 15.5 nm. The ratio of the TEM average particle diameter to the DLS average particle diameter: DLS average particle diameter/TEM average particle diameter of the dispersed iron oxide magnetic powder slurry according to Example 2 was calculated to be 2.3.

Example 3

A dispersed iron oxide magnetic powder slurry according to Example 3 was obtained by the same procedures as in Example 1 except that a 20 mass % malic acid aqueous solution was added in place of the citric acid aqueous solution as the second dispersant. Note that malic acid has two carboxy groups in the molecular structure, and has hydroxy group other than the carboxy groups. The DLS average particle diameter of the obtained dispersed iron oxide magnetic powder slurry was 42 nm. The TEM average particle diameter of the particles of the ε-type iron oxide contained in the obtained dispersed iron oxide magnetic powder slurry was 16.0 nm. The ratio of the TEM average particle diameter to the DLS average particle diameter: DLS average particle diameter/TEM average particle diameter of the dispersed iron oxide magnetic powder slurry according to Example 3 was calculated to be 2.6.

Example 4

A dispersed iron oxide magnetic powder slurry according to Example 4 was obtained by the same procedures as in Example 1 except that a powder of L-glutamic acid was added in place of the citric acid aqueous solution as the second dispersant, and the second dispersant was added so that the pH at 25° C. became 8.9. Note that L-glutamic acid has two carboxy groups in the molecular structure, and has an amino group other than the carboxy groups. The DLS average particle diameter of the obtained slurry was 25 nm. The TEM average particle diameter of the particles of the ε-type iron oxide contained in the obtained dispersed iron oxide magnetic powder slurry was 14.2 nm. The ratio of the TEM average particle diameter to the DLS average particle diameter: DLS average particle diameter/TEM average particle diameter of the dispersed iron oxide magnetic powder slurry according to Example 4 was calculated to be 1.8.

Example 5

A dispersed iron oxide magnetic powder slurry according to Example 5 was obtained by the same procedures as in Example 1 except that the citric acid aqueous solution was added so that the pH at 25° C. became 4.0 in the procedure 9 of Example 1. The DLS average particle diameter of the obtained slurry was 35 nm. The TEM average particle diameter of the particles of the ε-type iron oxide contained in the obtained slurry was 16.0 nm. The ratio of the TEM average particle diameter to the DLS average particle diameter: DLS average particle diameter/TEM average particle diameter of the dispersed iron oxide magnetic powder slurry according to Example 5 was calculated to be 2.2.

Comparative Example 1

A slurry with a pH at 25° C. of 13.0 obtained up to the procedure 8 of Example 1 is used as a dispersed iron oxide magnetic powder slurry according to Comparative Example 1. The DLS average particle diameter of the obtained slurry was 30 nm. The TEM average particle diameter of the particles of the ε-type iron oxide contained in the obtained slurry was 15.0 nm. The ratio of the TEM average particle diameter to the DLS average particle diameter: DLS average particle diameter/TEM average particle diameter of the dispersed iron oxide magnetic powder slurry according to Comparative Example 1 was calculated to be 2.0.

In the dispersed iron oxide magnetic powder slurry according to Comparative Example 1, the DLS average particle diameter and the DLS average particle diameter/TEM average particle diameter meet the conditions of claims 1 and 2 of the present invention, but the pH at 25° C. of the slurry is as high as 13.0, and therefore, it is necessary to adopt an expensive equipment specification in consideration of damage to the equipment to be used in the classification operation or the solid-liquid separation treatment, which is a large disadvantage in terms of production cost, and further, when it is mixed with a resin that is degraded at a high pH on the alkaline side, the resin may be degraded, and therefore, it is not suitable for use in a coating material containing magnetic particles for forming a magnetic layer constituting a magnetic recording medium.

Comparative Example 2

To the slurry obtained by the procedure 7 of Example 1, a 20 mass % NaOH aqueous solution was added so that the pH at 25° C. became 13.1, and the resulting mixture was stirred, and then dispersed using an ultrasonic disperser, whereby a slurry was prepared. The DLS average particle diameter was 139 nm.

To the obtained slurry, a 20 mass % citric acid aqueous solution was added as a dispersant so that the pH at 25° C. became 7.0, and the resulting mixture was stirred, and then dispersed using an ultrasonic disperser, whereby a dispersed iron oxide magnetic powder slurry according to Comparative Example 2 was obtained. The DLS average particle diameter of the obtained slurry was 145 run. The TEM average particle diameter of the particles of the ε-type iron oxide contained in the obtained slurry was 15.6 nm. The ratio of the TEM average particle diameter to the DLS average particle diameter: DLS average particle diameter/TEM average particle diameter of the dispersed iron oxide magnetic powder slurry according to Comparative Example 2 was calculated to be 9.3.

From the results, it is found that when the pH at 25° C. is adjusted to 11 or higher without adding a quaternary ammonium salt which is the first dispersant to the slurry containing the particles of the s-type iron oxide, a dispersed alkaline iron oxide magnetic powder slurry having a DLS average particle diameter as small as 65 nm or less cannot be obtained, and further, even if a compound having two or more carboxy groups and also having a hydroxy group other than the carboxy groups, which is the second dispersant, is added to the slurry, a dispersed iron oxide magnetic powder slurry having a DLS average particle diameter of 65 nm or less cannot be obtained.

Comparative Example 3

A dispersed iron oxide magnetic powder slurry according to Comparative Example 3 was obtained by the same procedures as in Example 1 except that a 10 mass % sulfuric acid aqueous solution was added in place of the citric acid aqueous solution in the procedure 9 of Example 1. The DLS average particle diameter of the obtained slurry was 2432 nm. The TEM average particle diameter of the particles of the ε-type iron oxide contained in the obtained slurry was 14.7 nm. The ratio of the TEM average particle diameter to the DLS average particle diameter: DLS average particle diameter/TEM average particle diameter of the dispersed iron oxide magnetic powder slurry according to Comparative Example 3 was calculated to be 165.4.

From the results, it is found that when the pH at 25° C. is merely adjusted to a value lower than 11 without adding a compound having two or more carboxy groups and also having one type or two types of a hydroxy group and an amino group other than the carboxy groups, which is the second dispersant, to the slurry containing the particles of the s-type iron oxide to which a quaternary ammonium salt is added, a dispersed iron oxide magnetic powder slurry having a DLS average particle diameter of 65 nm or less cannot be obtained.

Comparative Example 4

A dispersed iron oxide magnetic powder slurry according to Comparative Example 4 was obtained by the same procedures as in Example 1 except that a 20 mass % lactic acid aqueous solution was added in place of the citric acid aqueous solution in the procedure 9 of Example 1. The DLS average particle diameter of the obtained slurry was 1092 nm. The TEM average particle diameter of the particles of the s-type iron oxide contained in the obtained slurry was 14.8 nm. The ratio of the TEM average particle diameter to the DLS average particle diameter: DLS average particle diameter/TEM average particle diameter of the dispersed iron oxide magnetic powder slurry according to Comparative Example 4 was calculated to be 73.8.

From the results, it is found that even if the pH at 25° C. of the slurry is adjusted to a value lower than 11 after adding a compound having only one carboxy group in the molecule to the slurry containing the particles of the ε-type iron oxide to which a quaternary ammonium salt is added, a dispersed iron oxide magnetic powder slurry having a DLS average particle diameter of 65 nm or less cannot be obtained.

Comparative Example 5

A dispersed iron oxide magnetic powder slurry according to Comparative Example 5 was obtained by the same procedures as in Example 1 except that a 20 mass % 1,2,3-propanetricarboxylic acid aqueous solution was added in place of the citric acid aqueous solution in the procedure 9 of Example 1. Note that 1,2,3-propanetricarboxylic acid is a tricarboxylic acid having three carboxy groups in the molecular structure, but does not have a hydroxy group or an amino group in the molecule. The DLS average particle diameter of the obtained slurry was 496 nm. The TEM average particle diameter of the particles of the ε-type iron oxide contained in the obtained slurry was 15.4 nm. The ratio of the TEM average particle diameter to the DLS average particle diameter: DLS average particle diameter/TEM average particle diameter of the dispersed iron oxide magnetic powder slurry according to Comparative Example 5 was calculated to be 32.2.

From the results, it is found that when the pH at 25° C. is adjusted to a value lower than 11 by adding a compound having two or more carboxy groups in the molecular structure, but does not have a hydroxy group or an amino group other than the carboxy groups to the slurry containing the particles of the α-type iron oxide to which a quaternary ammonium salt is added, a dispersed iron oxide magnetic powder slurry having a DLS average particle diameter of 65 nm or less cannot be obtained.

Comparative Example 6

To a 0.099 mol/kg TEAOH aqueous solution, a 20 wt % citric acid was added dropwise so that the pH at 25° C. became 7.0, and the resulting mixture was stirred, whereby a TEAOH-citric acid mixed liquid was obtained.

To 20 g of the slurry obtained by the procedure 7 of Example 1, 80 g of the TEAOH-citric acid mixed liquid was added, and the resulting mixture was stirred, and then dispersed using an ultrasonic disperser, whereby a dispersed iron oxide magnetic powder slurry according to Comparative Example 6 was obtained. The DLS average particle diameter of the obtained slurry was 130 nm, and the pH at 25° C. was 7.7. The TEM average particle diameter of the particles of the s-type iron oxide contained in the obtained slurry was 16.2 nm. The ratio of the TEM average particle diameter to the DLS average particle diameter: DLS average particle diameter/TEM average particle diameter of the dispersed iron oxide magnetic powder slurry according to Comparative Example 6 was calculated to be 8.0.

From the results, it is found that even if the pH at 25° C. is adjusted to a value lower than 11 by adding a quaternary ammonium salt and a compound having two or more carboxy groups and also having one type or two types of hydroxy group and an amino group other than the carboxy groups to the slurry containing the particles of the ε-type iron oxide without going through a state where the pH at 25° C. is adjusted to 11 or higher by adding a quaternary ammonium salt, a dispersed iron oxide magnetic powder slurry having a DLS average particle diameter as small as 65 nm or less cannot be obtained.

TABLE 1

| | Addition of first dispersant | | | Addition of second dispersant | | | | | | |
|---|---|---|---|---|---|---|---|---|---|---|
| | Type of dispersant | pH after addition | DLS average particle diameter (nm) | Type of dispersant | pH after addition | DLS average particle diameter (nm) | TEM average particle diameter (nm) | DLS/TEM | Concentration of first dispersant mol/kg | Concentration of second dispersant mol/kg |
| Example 1 | TEAOH | 13.0 | 30 | citric acid | 7.0 | 26 | 16.1 | 1.6 | 0.096 | 0.167 |
| Example 2 | TEAOH | 13.0 | 30 | tartaric acid | 7.0 | 36 | 15.5 | 2.3 | 0.095 | 0.237 |
| Example 3 | TEAOH | 13.0 | 30 | malic acid | 7.0 | 42 | 16.0 | 2.6 | 0.096 | 0.238 |
| Example 4 | TEAOH | 13.0 | 30 | glutamic acid | 8.9 | 25 | 14.2 | 1.8 | 0.098 | 0.069 |
| Example 5 | TEAOH | 13.0 | 30 | citric acid | 4.0 | 35 | 16.0 | 2.2 | 0.091 | 0.407 |
| Comparative Example 1 | TEAOH | 13.0 | 30 | non | 13.0 | 30 | 15.0 | 2.0 | 0.099 | — |
| Comparative Example 2 | — | 13.1 | 139 | citric acid | 7.0 | 145 | 15.6 | 9.3 | — | 0.045 |
| Comparative Example 3 | TEAOH | 13.0 | 30 | sulfuric acid | 7.0 | 2432 | 14.7 | 165.4 | 0.095 | 0.459 |
| Comparative Example 4 | TEAOH | 13.0 | 30 | lactic acid | 7.0 | 1092 | 14.8 | 73.8 | 0.094 | 0.528 |
| Comparative Example 5 | TEAOH | 13.0 | 30 | 1,2,3-propane-tricarboxylic acid | 7.0 | 496 | 15.4 | 32.2 | 0.096 | 0.162 |
| Comparative Example 6 | Mixed liquid of TEAOH + citric acid is added in one step | | | | 7.7 | 130 | 16.2 | 8.0 | 0.077 | 0.134 |

The invention claimed is:

1. A dispersed iron oxide magnetic powder slurry, which is a dispersed iron oxide powder slurry, in which particles of ε-iron oxide or ε-iron oxide resulting from partial substitution of Fe sites by another metal element are dispersed in an aqueous solution, wherein the average secondary particle diameter of the particles of ε-iron oxide or ε-iron oxide resulting from partial substitution of Fe sites by another metal element measured with a dynamic light scattering particle size distribution analyzer (hereinafter referred to as a DLS average particle diameter) is 65 nm or less, and the pH at 25° C. is 4 or higher and lower than 11, wherein the dispersed iron oxide powder slurry contains a quaternary ammonium salt and a polycarboxylic acid, which is an organic acid having two or more carboxy groups in the molecule, and has one type or two types of a hydroxy group and an amino group other than the carboxy groups.

2. The dispersed iron oxide magnetic powder slurry according to claim 1, wherein the ratio of the DLS average particle diameter and the average particle diameter of the particles of ε-iron oxide or ε-iron oxide resulting from partial substitution of Fe sites by another metal element measured with a transmission electron microscope (hereinafter referred to as a TEM average particle diameter) (DLS average particle diameter/TEM average particle diameter) is 4 or less.

3. The dispersed iron oxide magnetic powder slurry according to claim 1, wherein the TEM average particle diameter is 8 nm or more and 30 nm or less.

4. The dispersed iron oxide magnetic powder slurry according to claim 1, wherein the quaternary ammonium salt is a tetraalkylammonium salt.

5. A method for producing a dispersed iron oxide magnetic powder slurry, comprising:

a step of adding a quaternary ammonium salt serving as a first dispersant and an alkali to a slurry containing particles of ε-iron oxide or ε-iron oxide resulting from partial substitution of Fe sites by another metal element, thereby obtaining a dispersed slurry with a pH at 25° C. of 11 or higher; and a step of adding a polycarboxylic acid, which is an organic acid serving as a second dispersant and having two or more carboxy groups in the molecule, and has one type or two types of a hydroxy group and an amino group other than the carboxy groups to the dispersed iron oxide powder slurry with a pH at 25° C. of 11 or higher, thereby bringing the pH at 25° C. of the slurry to a value lower than 11.

6. The method for producing a dispersed iron oxide magnetic powder slurry according to claim 5, wherein the DLS average particle diameter of the ε-iron oxide or the ε-iron oxide resulting from partial substitution of Fe sites by another metal element in the dispersed iron oxide magnetic powder slurry is 65 nm or less.

7. The method for producing a dispersed iron oxide magnetic powder slurry according to claim 5, wherein the quaternary ammonium salt is a tetraalkylammonium hydroxide.

* * * * *